(12) United States Patent
Sinai et al.

(10) Patent No.: US 10,337,677 B1
(45) Date of Patent: Jul. 2, 2019

(54) EDGE-LIT LUMINAIRE

(71) Applicants: Saman Sinai, Commerce, CA (US);
Benjamin Pouladian, Commerce, CA (US); Michael Bailey, Commerce, CA (US)

(72) Inventors: Saman Sinai, Commerce, CA (US);
Benjamin Pouladian, Commerce, CA (US); Michael Bailey, Commerce, CA (US)

( * ) Notice: Subject to any disclaimer, the term of this patent is extended or adjusted under 35 U.S.C. 154(b) by 0 days.

(21) Appl. No.: 15/982,566

(22) Filed: May 17, 2018

(51) Int. Cl.
| | |
|---|---|
| *F21K 9/61* | (2016.01) |
| *F21S 8/04* | (2006.01) |
| *F21V 7/22* | (2018.01) |
| *G02F 1/1335* | (2006.01) |
| *F21Y 115/10* | (2016.01) |

(52) U.S. Cl.
CPC ............... *F21K 9/61* (2016.08); *F21S 8/04* (2013.01); *F21V 7/22* (2013.01); *G02F 1/133553* (2013.01); *G02F 1/133555* (2013.01); *G02F 1/133605* (2013.01); *F21Y 2115/10* (2016.08)

(58) Field of Classification Search
CPC ...... F21K 9/61; F21V 7/22; F21S 8/04; F21S 43/239; F21S 43/235; F21S 41/24; F21Y 2115/10; G02F 2001/133557; G02F 1/133605; G02F 1/133555; G02F 1/133553; G02B 6/0031; B60Q 3/62; B60Q 1/0011
See application file for complete search history.

(56) References Cited

U.S. PATENT DOCUMENTS

| | | | | |
|---|---|---|---|---|
| 9,196,778 | B2* | 11/2015 | Niwa | G02B 5/0236 |
| 9,244,212 | B2* | 1/2016 | Holman | F21V 5/02 |
| 10,120,120 | B2* | 11/2018 | Pao | G02B 6/0036 |
| 2014/0140091 | A1* | 5/2014 | Vasylyev | G02B 6/001 |
| | | | | 362/606 |
| 2018/0203180 | A1* | 7/2018 | Horner | G02B 6/0073 |
| 2018/0216791 | A1* | 8/2018 | Leung | F21V 14/02 |
| 2018/0249560 | A1* | 8/2018 | Ando | F21V 23/06 |
| 2018/0341058 | A1* | 11/2018 | Grigore | G02B 6/0073 |

* cited by examiner

*Primary Examiner* — Joseph L Williams
*Assistant Examiner* — Jose M Diaz
(74) *Attorney, Agent, or Firm* — Omni Legal Group; Omid E. Khalifeh (57) ABSTRACT

An edge-lit luminaire designed to be of minimal weight and to distribute illumination evenly upon an environment is provided. In some embodiments, the luminaire comprises a frame, a plurality of panels, a light source, and power circuitry. More specifically, the panels are arranged at desired angles so as to maximize the evenness with which light is emitted from the light source, which is secured to interior sides of one or more edges of the frame. In use, the frame is lightweight and configured to mount within or suspend from a ceiling.

15 Claims, 6 Drawing Sheets

EDGE-LIT LUMINAIRE

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to luminaires and, more particularly, to an edge-lit luminaire configured to be of reduced weight and to increase the evenness with which light is distributed therefrom onto an environment.

BACKGROUND

Luminaires have a well-documented history of providing illumination in dark environments. Due to the high market demand for luminaires in all settings, innovation and improvements continue. One common application is in commercial and industrial settings. Such areas typically use volumetric luminaries adapted for recessed mounting in a suspended ceiling, that is, a portion of the troffer protrudes into the ceiling. Recessed ceilings are those which contain a hollow opening, known as the plenum area, for receiving components such as electrical wiring and light fixtures. These ceilings typically have support members, such as T bars, on which the square or rectangular ceiling tiles or lighting fixtures are placed. Recessed lights, such as troffers, fit within the plenum such that light shines onto an environment in a downward direction.

Traditional troffer-type fixtures were originally designed for fluorescent lamps. U.S. Pat. No. 5,823,663 to Bell et al. describes a fluorescent troffer lighting fixture intended for recessed mounting. These luminaires were visually appealing in that their texture and patterns were dynamic and interesting. However, these lamps have the drawback of high energy consumption, resulting in increased costs, and heat production, causing an increase in ambient temperature as well as a decrease in the life of the fixture. To solve these issues, light emitting diodes (LEDs) have emerged as an alternative. LEDs consume relatively low power and last much longer than conventional lamps. LEDs can be dimmed or cycled on and of without any significant adverse effect on its performance or lifetime. Additionally, LEDs emit a radiance more akin to that of natural daylight, lending for better aesthetics in the area being lit.

While these volumetric luminaries have replaced the fluorescent lamps with LEDs, they have not been redesigned to change the mechanical size. U.S. Pat. No. 8,905,575 to Durkee et al. and U.S. Pat. No. 9,494,293 to Pickard disclose troffer-style lighting fixtures adapted to include LEDs. A drawback of these fixtures is the extra volume and weight associated with the deep mixing chamber necessary to properly emit light. These deep optical chambers have corners and areas where light is not reflected well, resulting in uneven lighting and shadows. Some areas experience over-brightness, causing visual discomfort to users. Indeed, these deep mixing chambers cause the luminaire to extend up to four to six inches into the plenum area above the ceiling. This plenum area is often crowded with wiring and electrical components. Moreover, modern buildings are reducing ceiling space rendering these fixtures structurally too bulky.

To eliminate these size and weight concerns, edge-lit flat panels have emerged as a light source. Various forms of this technology have been introduced in applications such as signs, flat screen televisions, laptops, mobile phones, luminaries, and other displays. While these panels present an evenly lit surface, the flat surface causes the light to be emitted in a Lambertian distribution, resulting in uncomfortable glare. Another problem with edge-lit panels is they often entail the assembly of multiple separate components. For instance, U.S. patent application Ser. No. 13/473,929 teaches a flat panel lighting device. This arrangement greatly complicates the manufacturing process, thereby resulting in increased costs. Further, these large panels lack visual interest as they typically appear as a single square or rectangular slab when viewed in the ceiling. Thus, there is a need for visually appealing yet space-efficient lighting in commercial settings.

SUMMARY

The present disclosure is directed to edge-lit luminaires of lightweight which are designed to distribute light evenly on an environment.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the luminaire may comprise a frame configured to mount within or suspend from a ceiling. The frame may be defined by a plate having a top surface and a bottom surface. The frame is further defined peripherally by a first edge, a second edge, a third edge, and a fourth edge. The plate and each of the first, second, third, and fourth edges define an interior cavity of the luminaire. The frame is formed as a housing for at least one but in some embodiments a plurality of panels, as well as, a light source, power circuitry, a light guide, and a reflector.

According to certain embodiments, the frame is formed out of a single die-cast metal. In some instances, the frame is die-cast out of aluminum, which effectively dissipates heat produced by a light source, which may cause it to desirably function as a heat sink as well as a housing. The frame may also be die-cast out of magnesium, zinc, brass, copper, lead, pewter, tin, and alloys thereof. Of course, a person of ordinary skill in the art will recognize other materials known to those in the art as being suitable for die-casting, housing the internal elements, and acting as a heat sink, as the case may be.

The edge-lit luminaire further comprises a plurality of optically-transmissive panels that removably attach to the frame, each having an exterior surface and an interior surface opposing the exterior surface. In some embodiments, there may be three panels including a left side panel, a center panel, and a right side panel. The left side panel, center panel, and right side panel are sequentially and contiguously placed in that the left side panel and a left edge of the center panel abut in an edge-to-edge relationship. Similarly, the right side panel and a right edge of the center panel abut in an edge-to-edge relationship. In other embodiments, there may be two panels such as, simply, a left side panel and a right side panel. In such embodiments, the left side panel and the right side panel may be sequentially and contiguously placed in that a right edge of each left side panel and a left edge of each right side panel abut in an edge-to-edge relationship.

A light source may be disposed along one or more interior sides of the first, second, third, and fourth edges of the frame. In some exemplary embodiments, the light source is a plurality of light emitting diodes (LEDs). One of ordinary skill in the art will recognize that any various types of light sources available in the marketplace may be adapted to provide illumination according to this disclosure. For instance, the light source may be one or more fluorescent bulbs, incandescent bulbs, halogen bulbs, or laser diodes. Each light source may be coupled to a light guide, which redirects light produced by the light source, thereby reducing glare and minimizing visual discomfort. Moreover, power circuitry such as a driver, may be located within the interior cavity of the luminaire or remote therefrom. The power circuitry may be connected to one or more electrical sources and may pass electricity to the light source.

In certain exemplary embodiments, the edge-lit luminaire may further comprise a reflector placed along the bottom surface of the plate. The reflector is configured to reflect light emitted by the light source toward the plurality of panels such that it can ultimately be emitted through the exterior surface of the panels into, for example, a room below. Indeed, in some embodiments, one or more of the panels may slope linearly in an upward or downward direction toward a center portion of the interior cavity so that the light may be emitted through the exterior surface of the panels at a desirable angle. In some embodiments, the angle may be selected to, for example, reduce glare, distribute light more evenly, and/or minimize eye strain.

Accordingly, it is an object of the present invention to provide a lightweight edge-lit luminaire so as to better fit within the plenum area above the ceiling or suspend therefrom. Another object of this invention is to provide a luminaire, which is of easier manufacture as well as aesthetically attractive. It is yet another object of the invention to provide even light distribution upon an environment.

One or more of the above-disclosed embodiments, in addition to certain alternatives, are provided in further detail below with reference to the attached figures. The disclosed subject matter is not, however, limited to any particular embodiment disclosed.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Figure 1:
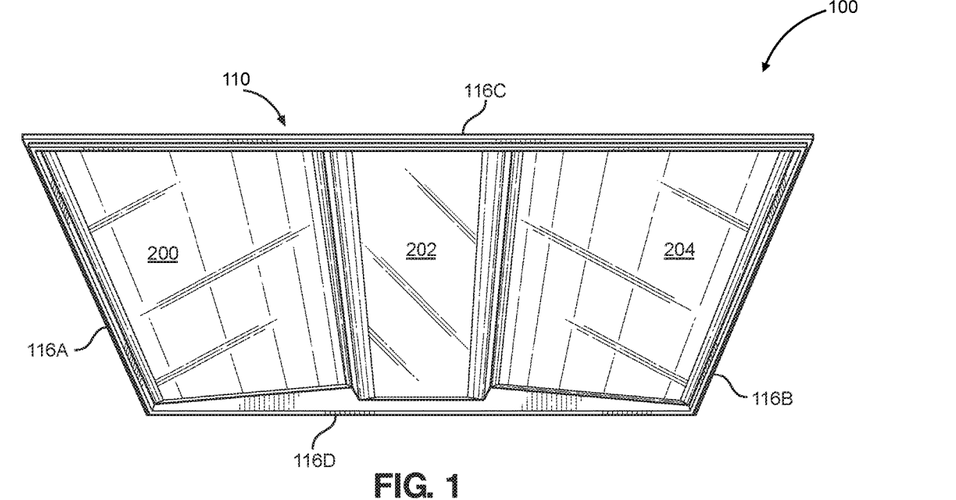
FIG. 1 is a perspective view of an embodiment of an edge-lit luminaire.

With reference to FIG. 1, one embodiment of an edge-lit luminaire 100 may comprise a frame 110 defining a housing for a plurality of optically-transmissive panels 200, 202, 204, as well as additional elements which will be discussed in greater detail below including a light source, and means for electrically coupling the light source to an external power supply, such as a driver, and other optional elements in order to provide uniform illumination on an environment. For purposes of brevity, edge-lit luminaires featuring two and three panels are shown and described, however, it will be understood that various styles of edge-lit luminaires may be adapted according to this disclosure to provide even illumination and decreased size.

Figure 2:
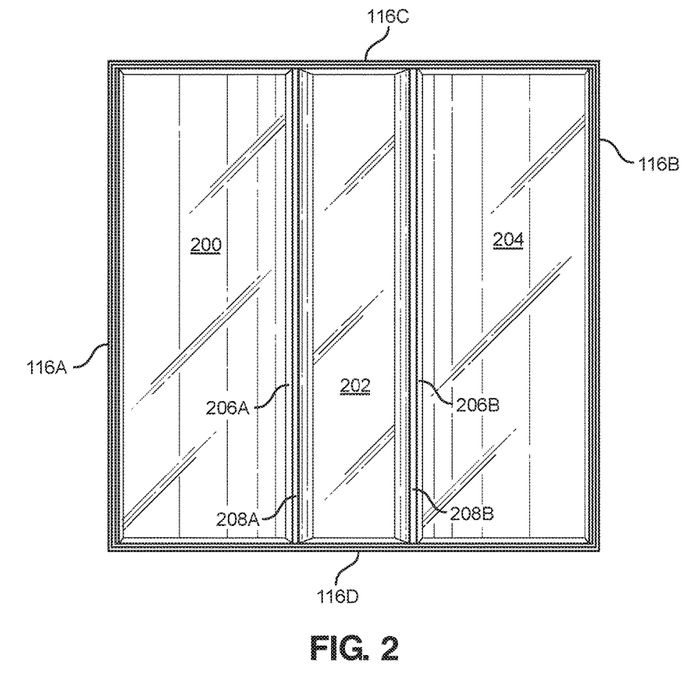
FIG. 2 is a bottom view of an embodiment of the edge-lit luminaire of FIG. 1.

An alternative view of the exemplary luminaire 100 is shown in FIG. 2. In some embodiments, the frame 110 is peripherally defined by a plurality of edges 116a, 116b, 116c, 116d. Additionally, turning to FIG. 3, which shows a cross-sectional view of the exemplary luminaire 100, the frame 110 may be further defined by a plate 112 having a top surface 114a and a bottom surface 114b. Together, the plate 112 and plurality of edges 116a, 116b (additional edges 116c, 116d having been obscured by the cross-section) define an interior cavity 120.

In certain embodiments, the frame 110 may be formed out of a single die-cast piece of metal. It is contemplated that die-casting the frame 110 may provide an easier method of manufacture and reduce the overall weight of the luminaire 100. Moreover, a single die-cast version of the frame 110 provides a monolithic design without the appearance of unsightly connections, fasteners, or seams. For instance, the frame 110 may be formed out of single die-cast aluminum. An aluminum frame may beneficially dissipate heat generated by any energy source, such as an electrical driver or lights, housed in the frame, thereby acting as a heat sink. The frame 110 may also be die-cast out of magnesium, zinc, brass, copper, lead, pewter, tin, steel, and alloys thereof. Of course, one of ordinary skill in the art will recognize the frame 110 may be formed out of any other metal suitable for die-casting.

It should be understood that the frame 110 may also be formed by soldering or otherwise joining each of the various elements comprising the frame 110 to one another. For instance, the plate 112 may be separate from, but securable to, each of the edges 116a, 116b, 116c, 116d. In some embodiments, the frame 110 may be comprised of one or more thin pieces of sheet steel. In other embodiments, the frame 110 may be constructed out of injection-molded plastic. Although exemplary embodiments depicted in the figures appear to be defined by rectangular-shaped geometry, alternative embodiments of the frame 110, such as that shown in FIG. 2, may have any number of different shapes. Thus, the rectangular shape of the frame 110 is offered by way of example only, and not limitation.

The frame 110 may be configured in a number of different sizes. In certain exemplary embodiments, the frame 110 may be about two feet wide by about two feet long. In other exemplary embodiments, the frame 110 may be about two feet wide by about four feet long. In yet other exemplary embodiments, the frame 110 may be about one foot wide by about four feet long. A person of ordinary skill in the art will recognize these sizes are merely exemplary, and the frame 110 can be any size as desired.

The frame 110 may be further configured to be suspended from, or recessed within, a ceiling or other surface. The luminaire 100 may be mounted within a ceiling such that the first, second, third, and fourth edges 116a, 116b, 116c, 116d are flush with the ceiling plane. Indeed, with reference again to FIG. 3, the top surface 114a of the plate 112 may protrude upward into the plenum above the ceiling. The luminaire 100 may be designed to have a reduced height profile such that the amount that the plate 112 extends into the plenum is reduced. In certain embodiments, the plate 112 may extend about two inches to about two and one-half inches into the ceiling. In other embodiments, the plate 112 may extend larger or shorter distances into the plenum area. In embodiments where the frame 110 mounts within the ceiling, a means for mounting may be provided and may include suitable fasteners, such as hanger bars, tie-offs, or support clips, for securing the luminaire to any joists or other mechanisms supporting the ceiling. Moreover, the means for mounting may include a mounting bracket or anchored wire support.

As noted above, an exemplary embodiment of the edge-lit luminaire 100 may have a left side panel 200, a right side panel 204, and a center panel 202. Each of the panels 200, 202, 204 may be formed as a sheet having an interior surface 201a facing the plate 112 and an opposing exterior surface 201b through which light from a light source 300 is emitted. These panels 200, 202, 204 removably engage with the first, second edges 116a, 116b, as well as obscured third, and fourth edges of the frame 110 to allow access to an interior cavity 120 formed therein. The left side panel 200 and a left edge 206a of the center panel 202 abut in edge-to-edge relationship along a line extending the length of the frame 110 between the first edge 116a and the second edge 116b.

In the event that the exemplary luminaire comprises three panels 200, 202, 204 as shown in FIG. 2, two panels, or even more in other embodiments, the frame 110 may further comprise additional supportive, elongated strips 208a, 208b interposed between abutting panels, such as left side panel 200 abutting the left edge 206a of the center panel 202. Such elongated strips 208a, 208b may extend the full length of the frame 110. More particularly, the left elongated strip 208a provides support for placement of the left side panel 200 and the center panel 202, which are configured to removably engage therewith. Similarly, the right side panel 204 and a right edge 206b of the center panel 202 abut in edge-to-edge relationship along a line extending the length of the frame 110 between the first edge 116a and the second edge 116b. A right elongated strip 208b may be interposed between said abutting right side panel 204 and the right edge 206b of the center panel 202 extending the full length thereof. The right elongated strip 208b provides support for placement of the right side panel 204 and the center panel 202, which are configured to removably engage therewith. Each of the left and right elongated strips 208a, 208b may be formed out of rugged material capable of supporting the weight of the panels 200, 202, 204.

In some embodiments, the left side panel 200 may angle inward relative to the plate 112 and toward the left edge 206a of the center panel 202 and the right side panel 204 may angle inward relative to the plate 112 and toward the right edge 206b of the center panel 202. In such embodiments, the angles created by the inward slanting of the left side and right side panels 200, 204 may desirably redirect light resulting in a pleasantly uniform illuminated environment. In other embodiments, the panels 200, 202, 204 may lie along the same plane. One of ordinary skill in the art will recognize a variety of angles are possible based on the desired direction of light output.

A person of ordinary skill in the art will recognize the panels 200, 202, 204 may be formed out of any optical grade translucent material. In some embodiments, the panels 200, 202, 204 may be formed out of micro-prismatic lens material that may modify the trajectory of light as it passes through the micro-prisms thereof. Micro-prismatic lens material uniformly disperses light on an environment thereby maximizing light transmission and also reducing glare. In other exemplary embodiments, the panels 200, 202, 204 may be variously formed out of a transmissive plastic, such as acrylic or polycarbonate. Moreover, the panels 200, 202, 204 may also be made of glass.

Figure 4:
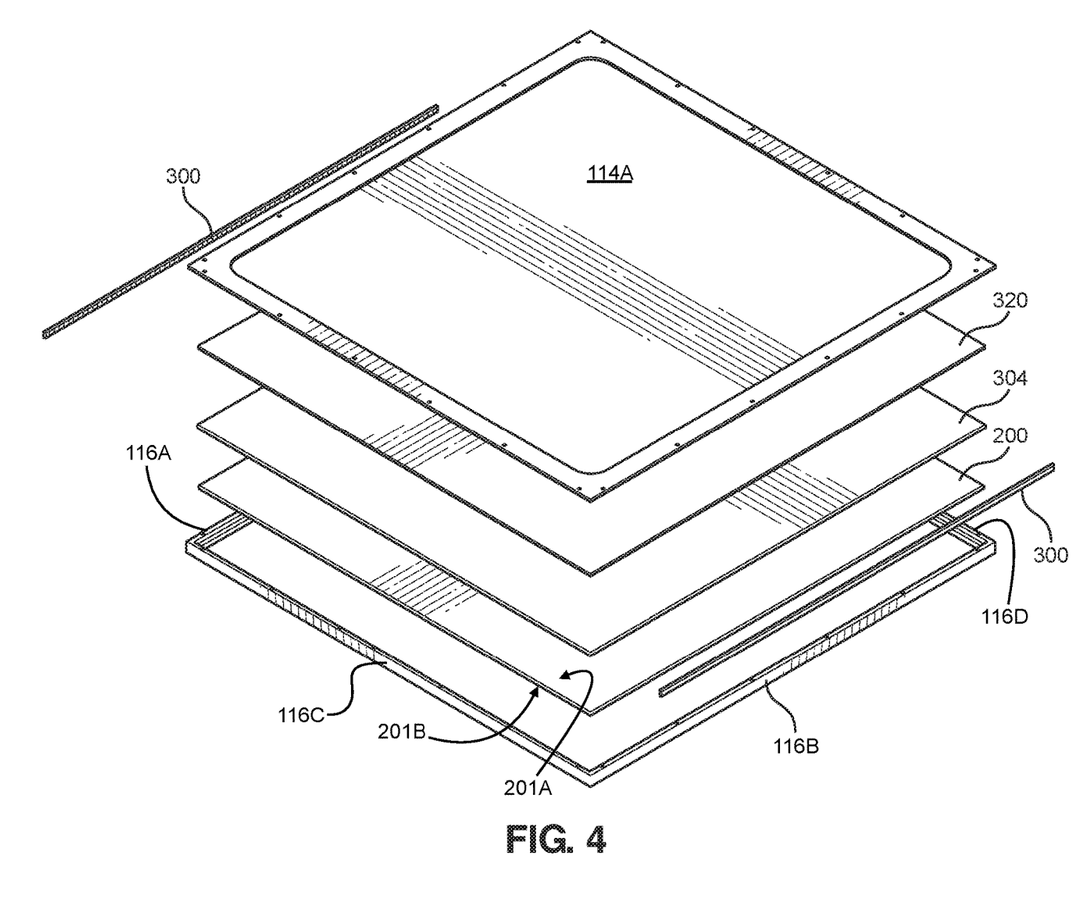
FIG. 4 is a front cross-sectional view of an edge-lit luminaire.

Turning attention to FIG. 4, for the sake of brevity and clarity, an exploded view of additional elements comprising an embodiment of an edge-lit luminaire is provided. An embodiment of the light source 300 may be coupled to a light guide 304 for directing light emitted from the light source 300 toward the exterior surface 201b of the panel 200. In particular, it is contemplated that light from the light source 300 will reflect through the light guide 304 until it is emitted through the microprismatic material of the panel 200. The light guide 304 redirects light from areas that may produce glare and refracts and reflects light to reduce visual glare which, in turn, provides greater visual comfort to humans. In certain exemplary embodiments, the light guide 304 may be disposed along the interior surface 201a of the panel 200. The light guide 304 may be made of an optically translucent polymer such as polycarbonate or acrylic.

Previously, the frame has been described as a single die-cut body, however, it may be seen in FIG. 4 that the frame may comprise a plate 112 that is securable to the first, second, third, and fourth edges 116a, 116b, 116c, 116d, such as by screwing, nailing, soldering, or other means. A reflector 320 may be mounted to the bottom surface 114b of the plate 112. The reflector 320 may be configured and positioned to redirect some of the light emitted from the light source 300, thereby increasing total light output through the exterior surface 201b of the panel 200. The reflector 320 should be highly reflective in the wavelength ranges of the chosen light source 300. The reflector 320 may comprise many different materials known to people having ordinary skill in the art and the reflector's 320 surface material may be selected to control the illumination pattern. For instance, the reflector 320 may be polished or painted with a reflective material. In other embodiments, the reflector 320 may be lined with a solder mask or a powder coat to creative the reflective characteristic. In certain embodiments, the reflector 320 may be substantially planar however, it is understood that the illumination pattern may be further controlled by altering the reflector's 320 curvature. Indeed, it is even contemplated that multiple reflectors 320 may be provided to increase control over the redirection of emitted light.

The edge-lit luminaire may include further elements to aid in its structure and manufacture. For instance, a pad may be disposed within the interior cavity to act as a buffer or insulator between any reflectors and plates. The pad may further protect the electrical components contained within, for example, any driver from heat generated by the light source and vice versa. The pad may be formed out of fiberglass or any other material suitable for this purpose. As another example, a controller for controlling delivery of energy from the driver to the light source may also be provided to allow the luminaire to be turned on and off and to control the shade and intensity of the light emitted from the light source. Moreover, while it is contemplated that the frame may be formed out of a conductive material and thereby acts as a heat sink, a separate heat sink may be included to dissipate the heat generated by the light source.

Figure 5:
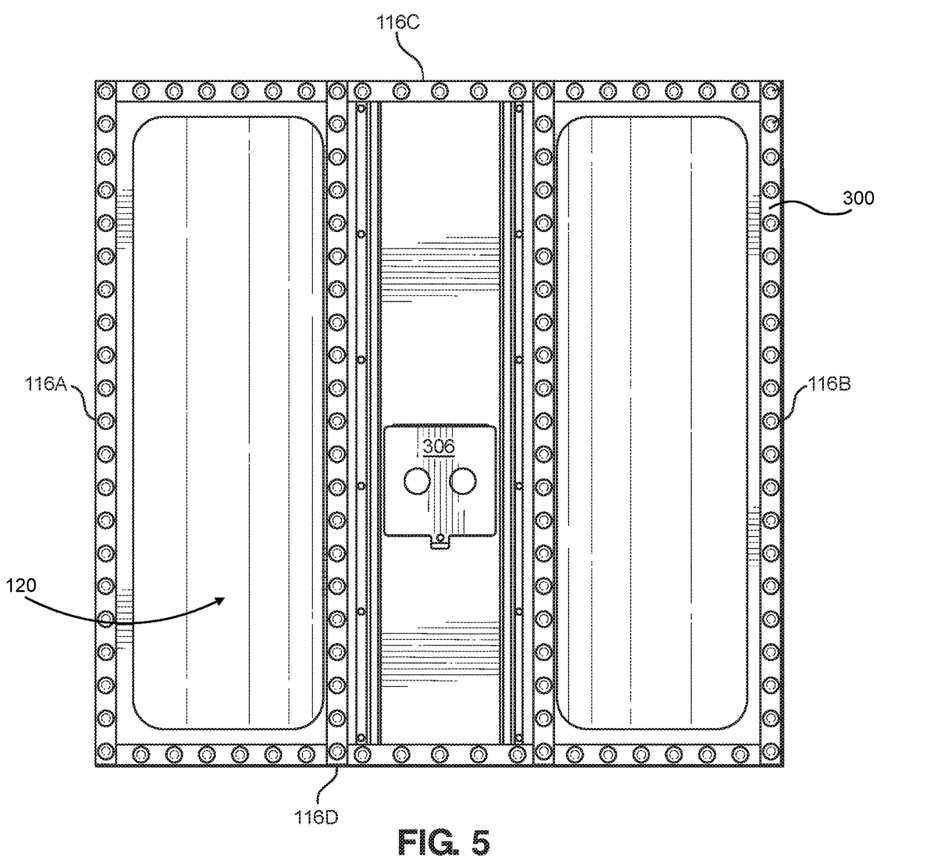
FIG. 5 is bottom view of an embodiment of an edge-lit luminaire wherein a light source, a reflector, and a driver are exposed.

FIG. 5 illustrates the edge-lit luminaire 100 with the panels and a portion of the frame removed to expose the contents of the interior cavity 120. In some embodiments, the light source 300 may be one or more LED light strips known to those skilled in the art comprising a plurality of LEDs in electrical communication with one another. More particularly, each of the LEDs includes a chip of semiconductive material that is treated to create a positive-negative junction. When electrical power is delivered to the LEDs, current flows from the positive side to the negative side of each junction, causing energy to be released in the form of light. Although LEDs are used as the light source 300 in various embodiments described herein, it is understood that other light sources 300, such as laser diodes, fluorescent, incandescent, halogen, or any other light source and/or combination of the same known for use in luminaires may be substituted as the light source 300 in embodiments of the invention.

A means for electrically coupling the light source 300 to an external power supply may be a driver 306 disposed within the interior cavity 120. In alternative embodiments, the driver 306 may be placed outside of the luminaire. While a driver 306 is shown and described, a person of ordinary skill in the art will recognize other means for electrically coupling the light source 300 to an external power supply based on the type of light source 300 utilized. For instance, the means for electric coupling may be a ballast.

Figure 3:
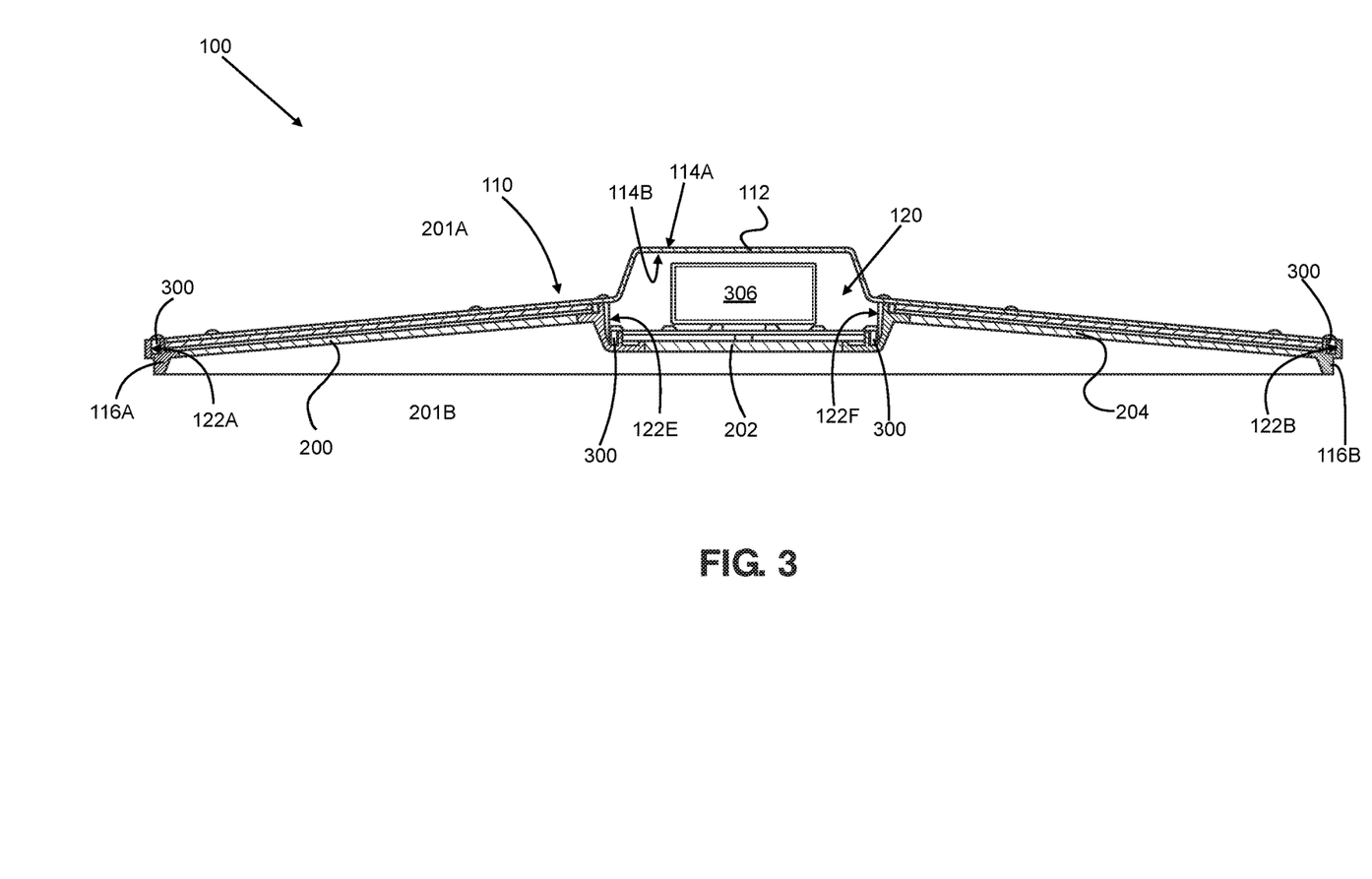
FIG. 3 is an exploded view of a panel.

Turning attention back to FIG. 3, each of the edges 116a, 116b, 116c, 116d may include a corresponding interior side 122a, 122b, 122c (obscured), 122d (obscured) facing toward the interior cavity 120. The left and right elongated strips 208a, 208b each include an interior side 122e, 122f. Each of the interior sides 122a, 122b, 122c, 122d, 122e, 122f may be capable of mounting the light source 300. In certain exemplary embodiments, the light source 300 may be disposed on or along the entire periphery interior cavity 120 of the frame 110. In such embodiments, the light source 300 evenly distributes light across each of the panels 200, 202, 204 to emit light from the exterior surface 201b. In other embodiments, the light source 300 may be disposed along one or more of the surfaces, allowing the light from the light source 300 to be emitted in an asymmetric distribution.

The color of the emitted light may depend on the materials used to make each of the LEDs. For instance, red LEDs typically include aluminum gallium arsenide, blue or ultraviolet LEDs typically include indium gallium nitride or gallium nitride, and green LEDs typically include aluminum gallium phosphide. Each of the LEDs may be configured to produce the same or a distinct color of light.

While embodiments of the luminaire have been described as having one or three panels thus far, numerous arrangements and quantities of panels are contemplated. Each of the panels, reflectors, light guides, and other elements may be provided in equal numbers, however, in some embodiments, it is contemplated that some elements may exist in fewer or greater numbers than other elements.

Figure 6:
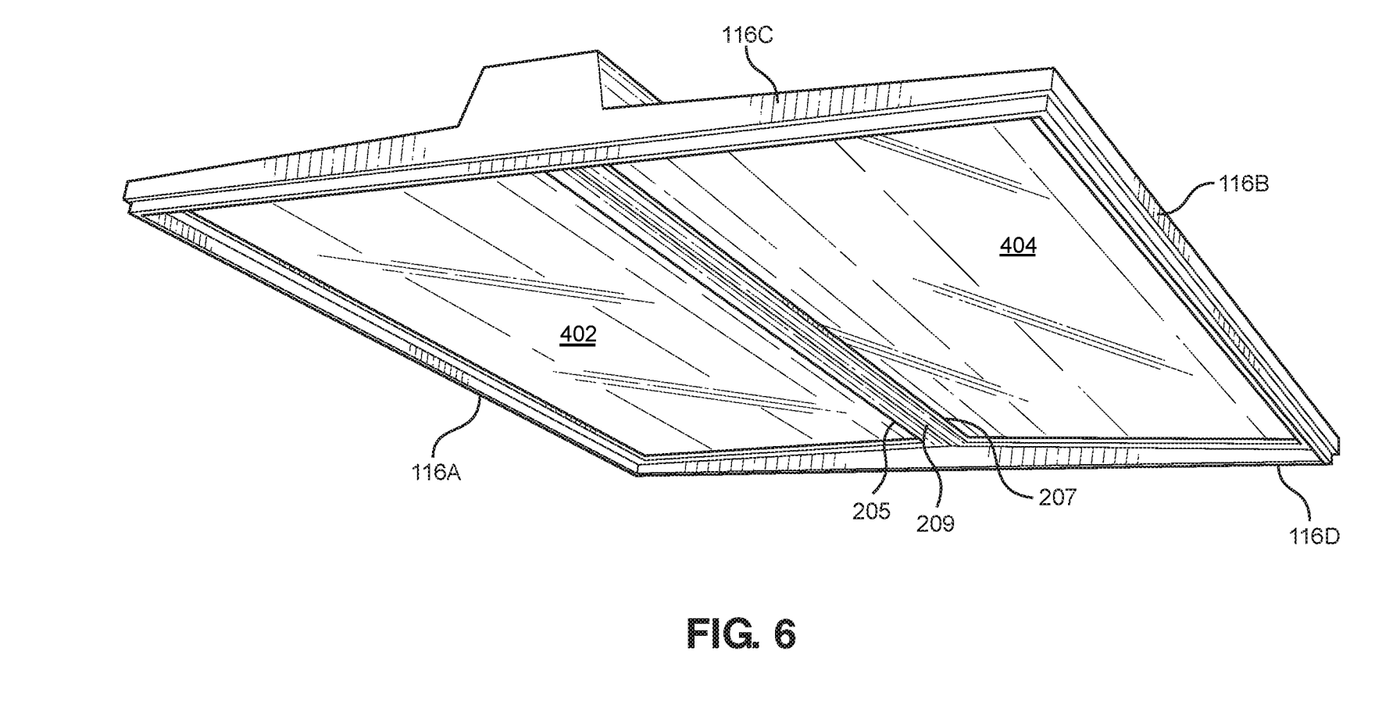
FIG. 6 is a perspective view of an edge-lit luminaire having two angled panels in accordance with one exemplary embodiment of the invention.
Figure 7:
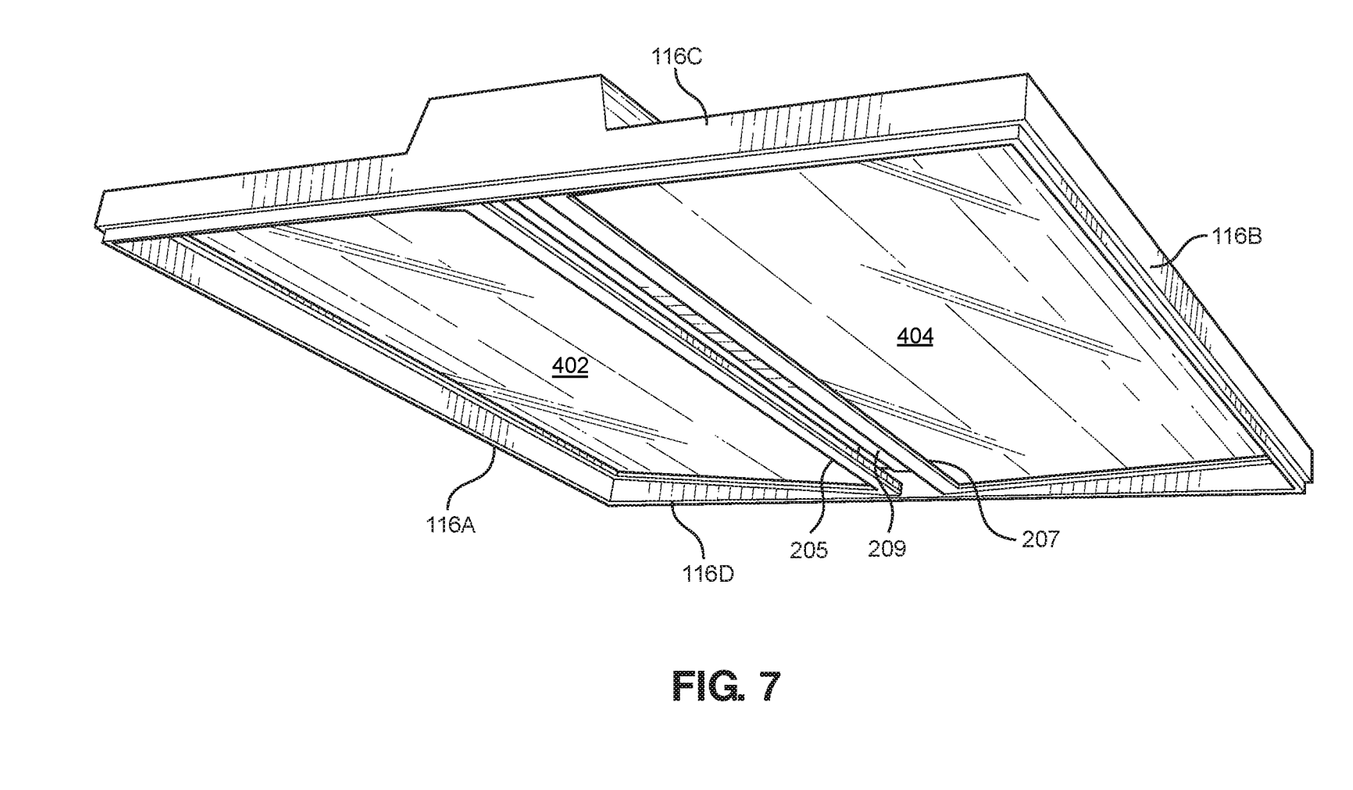
FIG. 7 is a perspective view of an edge-lit luminaire having two angled panels in accordance with one exemplary embodiment of the invention.

With reference to FIGS. 6 and 7, the edge-lit luminaire may comprise two panels, that is, a left side panel 402 and a right side panel 404. The left side panel 402 and the right side panel 404 abut in an edge-to-edge relationship such that a right edge 205 of the left side panel 402 abuts a left edge 207 of the right side panel 404. As before, an elongated strip 209 may be interposed between abutting panels 402, 404. The elongated strip 209 provides support for the placement of the left side panel 402 and the right side panel 404, which removably engage therewith. Further, the panels 402, 404 may be arranged within the frame 110 at a number of different angles. As depicted in FIG. 6, the left side panel 402 and the right side panel 404 may angle inward relative to one another and toward the plate 112. Alternatively, and as shown in FIG. 7, the left side panel 402 and the right side panel 404 may angle downward and away from the plate 112.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited, except as by the appended claim(s).

The teachings disclosed herein may be applied to other systems and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the edge-lit luminaire with which that terminology is associated. In general, the terms used in the following claims should not be constructed to limit the edge-lit luminaire to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the edge-lit luminaire is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the edge-lit luminaire.

What is claimed is:

1. An edge-lit luminaire comprising:
    a frame that is defined by
        a plate, having a top surface and a bottom surface;
        a first edge;
        a second edge;
        a third edge;
        a fourth edge;
        wherein the plate, the first edge, the second edge, the third edge, and the fourth edge define an interior cavity;
    at least three optically-transmissive panels sequentially aligned with one another and defined at least by
        a left side panel;
        a right side panel;
        at least one central panel;
        wherein each of the left side, right side, and central panels are defined by at least a left edge and a right edge, and
        wherein the at least one central panel is disposed between the left side panel and the right side panel such that the left edge of the at least one central panel is disposed adjacent the right edge of the left side panel and the right edge of the at least one central panel is disposed adjacent the left edge of the right side panel;
    a light source operable to deliver light into the interior cavity and disposed adjacent an interior side of at least one of the first, second, third, or fourth edges of the frame; and
    means for electrically coupling the light source to an external power supply.

2. The edge-lit luminaire of claim 1, wherein the left side panel and the right side panel slope linearly in an upward direction toward the left edge and the right edge of the at least one central panel.

3. The edge-lit luminaire of claim 1, wherein the left side panel and the right side panel slope linearly in a downward direction toward the left edge and the right edge of the at least one central panel.

4. The edge-lit luminaire of claim 1, wherein the left side, the right side, and the at least one central panel are positioned substantially within the same plane.

5. An edge-lit luminaire comprising:
    a frame that is defined by
        a plate, having a top surface and a bottom surface;
        a first edge;
        a second edge;
        a third edge;
        a fourth edge;
        wherein the plate, the first edge, the second edge, the third edge, and the fourth edge define an interior cavity;
    at least two optically-transmissive panels arranged in edge to edge relationship and defined at least by
        a left side panel, having a right edge;
        a right side panel disposed adjacent the left side panel and having a left edge abutting the right edge of the left side panel;
    a light source operable to deliver light into the interior cavity and disposed adjacent an interior side of at least one of the first, second, third, or fourth edges of the frame; and
    means for electrically coupling the light source to an external power supply.

6. The edge-lit luminaire of claim 5, wherein the left side panel is linearly sloped in a downward direction toward the right edge of the left side panel and the right side panel is sloped linearly in a downward direction toward the left edge of the right side panel.

7. The edge-lit luminaire of claim 5, wherein the left side panel is sloped linearly in an upward direction toward the right edge of the left side panel and the right side panel is sloped linearly in an upward direction toward the left edge of the right side panel.

8. The edge-lit luminaire of claim 1, further comprising:
    at least one light guide disposed along an interior surface of the panels; and
    at least one reflector configured to reflect a portion of the light emitted by the light source toward the exterior surface of the panels and disposed adjacent the bottom surface of the plate.

9. The edge-lit luminaire according to claim 1 or 5, wherein the frame is configured to mount within a ceiling.

10. The edge-lit luminaire according to claim 1 or 5, wherein the frame is configured to suspend from a ceiling.

11. The edge-lit luminaire according to claim 1 or 5, wherein the means for electrically coupling the light source to an external power supply is a driver disposed within the interior cavity of the frame.

12. The edge-lit luminaire according to claim 1 or 5, wherein the light source is a plurality of light emitting diodes.

13. The edge-lit luminaire according to claim 1 or 5, wherein the plate extends into the ceiling at a depth of 2-2.5 inches.

14. The edge-lit luminaire according to claim 1 or 5, wherein the frame is rectangular.

15. The edge-lit luminaire according to claim 1 or 5, wherein the frame is square.

* * * * *